D. R. SMITH.
Cotton and Hay Press.
No. 209,429. Patented Oct. 29, 1878.
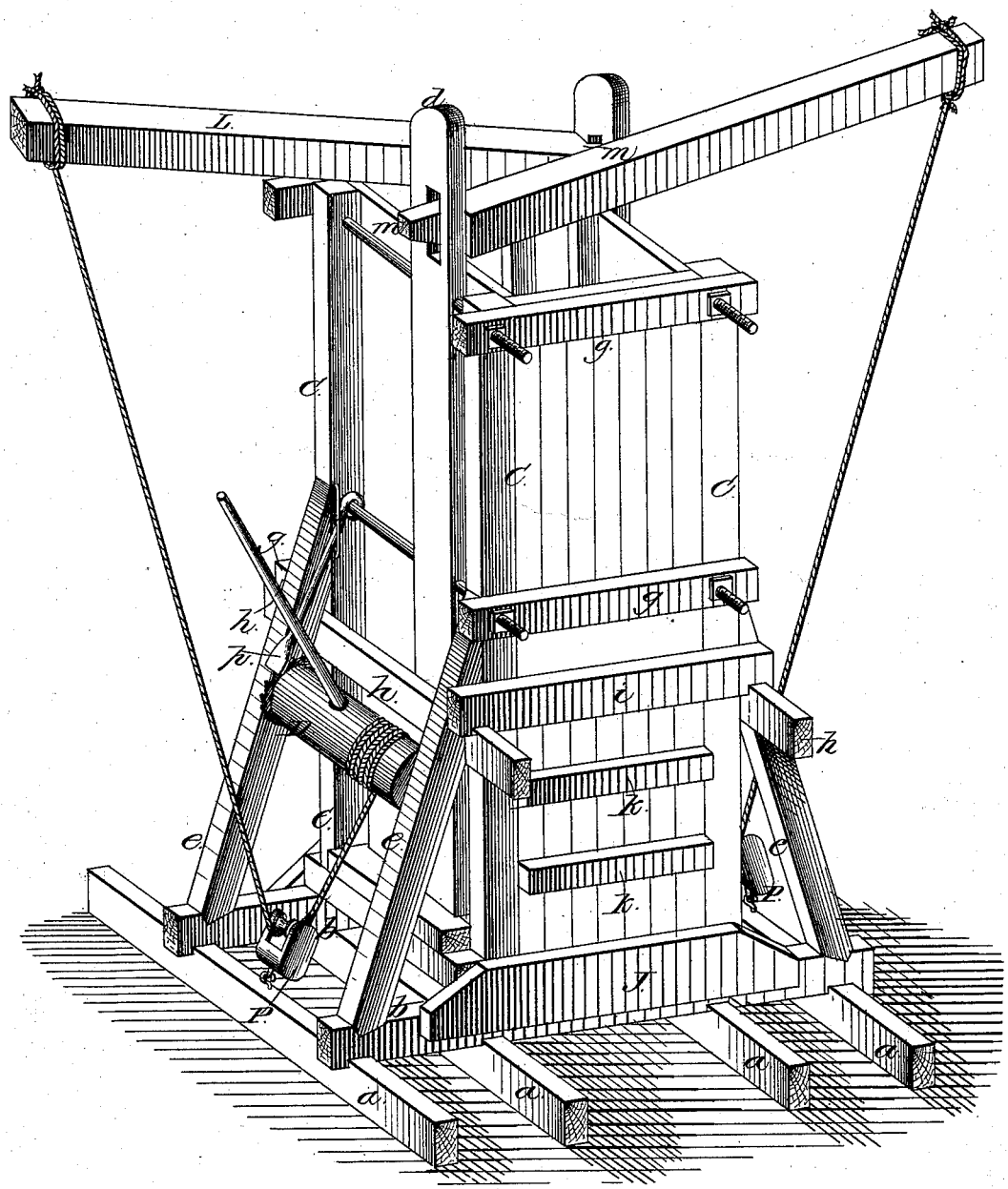
Witnesses:
G. W. Thomas.
A. Glenn
Inventor:
Drury R. Smith.

UNITED STATES PATENT OFFICE.

DREWRY R. SMITH, OF DALTON, GEORGIA.

IMPROVEMENT IN COTTON AND HAY PRESSES.

Specification forming part of Letters Patent No. 209,429, dated October 29, 1878; application filed January 24, 1878.

*To all whom it may concern:*

Be it known that I, DREWRY R. SMITH, of Whitfield county, in the State of Georgia, (post-office address, Dalton, Georgia,) have invented a new and useful Improvement in Presses for Baling Cotton, Hay, or any other material requiring compression, of which the following is a specification:

My invention relates to and consists in cheapness and facility of construction at home on the farm by any ordinary mechanic or farmer at all acquainted with the use of tools, in the portability of the press, in the speed and efficiency of the power, whether applied by hand or otherwise, and in the automatic or self-tightening effect of the combination and arrangement of the double center-posts, double levers, double ropes and pulley-blocks, and double drums, (or wheels and axles,) with ratchets and pawls, all arranged to be worked by hand or other power, substantially as hereinafter described, and as shown in the accompanying drawing.

In constructing my press, I first lay down four bed-sills, $a$, at proper distances apart, as shown in the drawing. Into these bed-sills let in the longer sills $b$. Next set up the corner-posts $d$, dovetailed into the long sills, and the two center-posts $d$, dovetailed into the two middle bed-sills. The center-posts should be so placed, one nearer to one side of the press and the other nearer to the opposite side, that the large levers L, which work in mortises cut near the top of each center-post, will clear each other and the opposite center-post in working at right angles each to its own center-post. Next let in the braces $e$ on shoulders cut in the corner-posts and long sills, as shown in the drawing. Then lay down small sleepers crosswise, and on them the flooring of the press-box. On this flooring nail slats, so as to form grooves for the ropes or other fastenings of the bales. Then fasten the scantlings $g$ $g$ with nails, or they may also be made more secure by iron rods headed at one end, and with screws and nuts or holes and keys at the other. Plank up the ends of the press-box crosswise or horizontally by nailing to the corner and center-posts. Plank up the sides above the openings for the doors on either side by nailing vertically to the scantlings $g$ $g$, beveling the lower end of the planking so as to receive the doors, which are also beveled at top to match. Put on the clamps $h$ $h$, one at each end of the press-box, with notches cut flush with the outside of the corner-posts so as to keep them from spreading, and with other notches at right angles to those just mentioned, to receive and hold the bars $i$ for closing the doors at top. Fasten on the base-boards $j$, thus forming grooves or fastenings for bottom of doors. The doors are battened and beveled at top to shut close, and when shut are secured by the bars $i$, which slip into the notches cut into the upper side of the clamps $h$.

The planking and doors of the press-box may be tongued and grooved and dressed; but in baling hay even this cost may be dispensed with.

Mortises are cut in the center-posts at $m$ to receive the ends of the large levers L, which have tenons cut with a shoulder on the outer side, the tenons being curved or rounded underneath for convenience of moving the levers up and down.

D D are wheels and axles across the ends of the press and between the braces $e$ $e$, with ratchets into which the pawls $p$ $p$ catch. A cheap substitute for wheels and axles would be drums made of round blocks of any hard wood—the harder the better—with axles of one-inch round iron working in holes bored through the braces $e$ $e$ and lengthwise through the drums. It is immaterial whether the drums are fastened tight to the axles so as to revolve with them, or are loose so as to revolve on them. The drums may have mortises cut with a chisel, or round holes bored with an auger, to receive the small levers for working them. They may have iron ratchet-bands and pawls, or even this cost may be dispensed with, and, instead of being made of iron, the ratchets may be cut in the wood of the drums, and the pawls may also be of any hard wood, and fastened either to the braces $e$ $e$, or to the corner-posts, or to the iron strengthening-rods which secure the lower scantlings $g$, should such rods be used.

To the power ends of the large levers L L ropes or chains are attached of sufficient length to pass through pulley-blocks P P fastened to the outer bed-sills, and up to the axles or drums D D, and there made fast; or the ropes or chains may be made fast to the outer bed-sills and pass up to pulley-blocks at the power ends of the large levers, and then down to other pulley-blocks fastened to the outer bed-sills, and up to the axles or drums. The pulley-blocks should be secured to the bed-sills by ropes or chains, so as to allow sufficient play for them to keep in line with the ropes or chains as they wind around the axles or drums.

This simple and cheap press, which any farmer can put up for himself, was readily hauled on a common two-horse wagon nine miles, and tested in comparison with other costly presses, to the entire satisfaction of the spectators and inventor, who believes from the result of that test that for cheapness and facility of construction, durability, portability, efficiency, and speed it is not surpassed by any other press heretofore invented.

The mode of operation is so obvious as to seem to require no further description; but perhaps it may be well to add that, the press-box being filled with the material to be compressed, the follower is then put on, and on it two scantlings of equal length are placed, one under each of the large levers L L; then a small boy at the wheels, or small lever of the drums, brings down the large levers till they touch the top of the press-box, the pawls and ratchets securing the axles or drums. Then raise one of the large levers and put under it a longer scantling and tighten that lever. Then raise the other lever and place under it another scantling of equal length with the last mentioned, and tighten that lever. Then apply the power to both levers. Repeat this, if necessary, with longer scantlings until the bale is sufficiently compressed to be easily taken out at one of the doors on either side.

In this description and in the drawing it is deemed sufficient to refer to and give a view of one side of the press only, as the reverse side is identically the same, except where the iron strengthening-rods are used, with heads on one side and nuts and screws or holes and keys on the other.

What I claim as my invention is—

The combination and arrangement of the double center-posts, with mortises for the large levers to work in, the double large levers, double ropes and pulley-blocks, and double wheels and axles or drums, with the ratchets and pawls, substantially as herein described.

DREWRY R. SMITH.

Witnesses:
BEN E. GREEN,
JESSE A. GLENN.